(12) United States Patent
Kallio et al.

(10) Patent No.: US 6,291,611 B1
(45) Date of Patent: *Sep. 18, 2001

(54) SUPPORTED OLEFIN POLYMERIZATION CATALYST, ITS PREPARATION AND USE

(75) Inventors: Kalle Kallio, Vanhakylä; Ove Andell, Helsinki; Hilkka Knuuttila; Ulf Palmqvist, both of Porvoo, all of (FI)

(73) Assignee: Borealis Holding A/S, Lyngby (DK)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/481,336
(22) PCT Filed: Nov. 4, 1994
(86) PCT No.: PCT/FI94/00499
§ 371 Date: Aug. 2, 1995
§ 102(e) Date: Aug. 2, 1995
(87) PCT Pub. No.: WO95/12622
PCT Pub. Date: May 11, 1995

(30) Foreign Application Priority Data

Nov. 5, 1993 (FI) ........................................................ 934917

(51) Int. Cl.$^7$ .................................................. C08F 4/642
(52) U.S. Cl. ........................ 526/129; 526/160; 526/943; 526/114; 502/104; 502/113; 502/117; 502/120
(58) Field of Search .................................. 502/104, 113, 502/117, 120; 526/97, 124.2, 129, 160, 114, 943

(56) References Cited

U.S. PATENT DOCUMENTS

| 4,404,344 | | 9/1983 | Sinn et al. . | |
|---|---|---|---|---|
| 4,923,833 | * | 5/1990 | Kioka et al. | 502/9 |
| 5,001,205 | | 3/1991 | Hoel . | |
| 5,017,665 | | 5/1991 | Chang . | |
| 5,057,475 | * | 10/1991 | Canich et al. | 526/129 |
| 5,227,440 | * | 7/1993 | Canich et al. | 526/129 |
| 5,240,894 | | 8/1993 | Burkhardt et al. . | |
| 5,242,876 | | 9/1993 | Shamshoum et al. . | |
| 5,331,071 | * | 7/1994 | Kataoka et al. | 526/128 |
| 5,332,706 | * | 7/1994 | Nowlin et al. | 502/107 |
| 5,359,015 | * | 10/1994 | Jejelowo | 526/114 |
| 5,420,220 | * | 5/1995 | Cheruvu et al. | 526/348.1 |
| 5,473,028 | * | 12/1995 | Nowlin et al. | 526/114 |
| 5,608,019 | * | 3/1997 | Cheruvu et al. | 526/129 |

FOREIGN PATENT DOCUMENTS

| 1268753 | 5/1990 | (CA) . |
|---|---|---|
| 2093056 | 10/1993 | (CA) . |
| 2608863 | 9/1977 | (DE) . |
| 2608933 | 9/1977 | (DE) . |
| 3240382 | 5/1984 | (DE) . |
| 0035242 | 9/1981 | (EP) . |
| 0037894 | 10/1981 | (EP) . |
| 0069951 | 1/1983 | (EP) . |
| 0279863 | 8/1988 | (EP) . |
| 0347129 | 12/1989 | (EP) . |
| 0474391 | 3/1992 | (EP) . |
| 0563917 | 10/1993 | (EP) . |
| 0589638 | 3/1994 | (EP) . |
| 862625 | 12/1986 | (FI) . |
| 931423 | 10/1993 | (FI) . |
| WO9600243A1 | 1/1996 | (WO) . |

OTHER PUBLICATIONS

Cationic Polymerization of Olefins: A Critical Inventory Joseph P. Kennedy, pp. 8–9 (Date Uncertain).
Makromol. Chem. 191, 725–730 (1990).

* cited by examiner

*Primary Examiner*—David W. Wu
*Assistant Examiner*—R. Rabago
(74) *Attorney, Agent, or Firm*—Birch, Stewart, Kolasch & Birch, LLP (57) ABSTRACT

Olefin polymerization comprising catalysts based on a metallocene, an alumoxane and a support are disclosed. The process for the preparation of a supported olefin ploymerization catalyst comprises:

a) a metallocene/activator reaction product, a solvent capable of dissolving it, and a porous support are brought into mutual contact, and b) the solvent is removed, and wherein step a) is carried out so that the porous support is impregnated with a volume of the metallocene/activator reaction product and solvent, which does not exceed the total pore volume of the support.

10 Claims, 5 Drawing Sheets

SUPPORTED OLEFIN POLYMERIZATION CATALYST, ITS PREPARATION AND USE

The invention relates to a new process for the preparation of a supported olefin polymerization catalyst. The invention also relates to a supported olefin polymerization catalyst prepared by such a process and its use for the homo- and copolymerization of olefins as well as a novel process for the preparation of polyethylene having a high bulk density.

Alpha-olefins, including ethylene, have so far been polymerized (homo- or copolymerized) by using heterogenous catalyst systems made up of a procatalyst based on a transition metal and a cocatalyst based on aluminum alkyl. It has been observed that the homogenous or supported catalyst systems, the pro-catalyst component of which is based on metallocene compounds such as bis (cyclopentadienyl) titanium dialkyl or bis (cyclopentadienyl) zirconium alkoxy, or chlorides of these, alumoxane or an ionic activator having been used as their activator, are also useful in the polymerization of ethylene.

A generally known problem in the use of metallocene catalysts is the poor morphology of the forming polymer material; this is seen in particular in a low bulk density and in the polymer being non-homogenous. Since the so-called replica phenomenon applies to polymerization, i.e. the forming polymer particles obtain a morphology similar to that of the catalyst particles used for their preparation, the problem can be solved only by improving the morphology of the catalyst used for the polymerization.

DE patent publication 2 608 863 discloses the use, for ethylene polymerization, of a catalyst system made up of bis-(cyclopentadienyl)titanium dialkyl, aluminum trlalkyl, and water. DE patent publication 2 608 933 describes an ethylene polymerization catalyst system made up of zirconcenes having the general formula $(Cp)_n ZrY_{4-n}$, where Cp is a cyclopentadienyl, n is a numeral 1–4, Y is group R, $CH_2AlR_2$, $CH_2CH_2AlR_2$ or $CH_2CH(AlR_2)_2$, R being an alkyl group or a metal alkyl group; of an aluminum trialkyl cocatalyst; and of water.

European patent application 35242 discloses a method for the preparation of ethylene polymers and atactic propylene polymers in the presence of a halogen-free Ziegler-Natta catalyst system made up of (1) a cyclopentadienyl compound having the formula $(Cp)_n MY_{4-n}$, where Cp and n are the same as above, M is a transition metal, preferably zirconium, and Y is a hydrogen atom, a $C_1$–$C_5$ alkyl group or metal alkyl group or a radical having the general formula $CH_2AlR_2$, $CH_2CH_2AlR_2$ or $CH_2CH(AlR_2)_2$, where R is a $C_1$–$C_5$ alkyl group or metal alkyl group; and of (2) alumoxane serving as an activator.

Homogenous catalyst systems in which a metallocene or alumo-xane is used have been disclosed, for example, in EP patent application 69951 and U.S. Pat. No. 4,404,344. It has been known in the art to support the metallocene catalyst on a carrier. DE 3240382C2 teaches a catalyst, which comprises alumoxane and a cyclopentadienyl titanium or zirconium compound supported on a dried inorganic filler, which can be any inorganic compound, also silicate, quartz and aluminium-oxid. However, excess amounts of solvents are used and the inventors strive to get filler into the polymer. Use of supports for metallocene catalysts is also disclosed in EP 0037894B1.

Application publication 862625 discloses a method for the preparation of a supported catalyst intended for olelefin polymerization, wherein alumoxane in an inert hydrocarbon solvent and a metallocene of a 4A, 5A or 6A metal of the Periodic Table are added to a slurry of the support in an inert hydro-carbon solution.

EP patent publication 279863 describes the preparation, by a slurry process, of a catalyst intended for the polymerization of alpha-olefins. The catalyst thereby obtained is further given a finishing treatment by polymerizing olefin onto its surface; this suggests a poor morphology of the original catalyst, an attempt being made to improve it by this so-called prepolymerization.

Publication U.S. Pat. No. 5,017,665 discloses a catalyst suitable for the copolymerization of ethylene and 1,4-hexadiene, the catalyst being prepared by adding 330 ml of a 10% alumoxane solution in toluene to 800 g of silica powder (Davison 948). Thereafter, 250 ml of toluene is further added to the silica treated with alumoxane, whereafter 2.5 g of bis(indenyl) zirconium dichloride slurried in 40 ml of toluene is added to the obtained slurry. Finally the treated support is dried. Table I of the said patent publication shows that the activity of the obtained catalyst is not very good; with a catalyst feed rate of 1 g of catalyst per hour, only approx. 100 g of polyethylene per hour is obtained, which is a very low activity for practical purposes.

Publications EP-347129 and U.S. Pat. No. 5,001,205 disclose a process for the preparation of a bis (cyclopentadienyl) zirconium alumoxane catalyst on a silica support, wherein 30 ml of a methyl alumoxane solution in toluene was poured onto 15 g of silica gel and was dried. Thereafter a solution of bis (cyclopentadienyl) zirconium dichloride derivative in toluene was added in drops to 2 g of the said alumoxane-treated silica gel, and a small amount of toluene was further added to form a slurry. Finally the slurry was dried, and a supported catalyst havina a zir-conium concentration of approx. 0.5% by weight was obtained. Before the actual polymerization, the catalyst was coated by prepolymerization. Thus, the catalysts of these publications are also prepolymerized, which suggests a poor morphology of the original catalyst, an attempt being made to improve it by prepolymerization.

Patent CA-1268753 describes the bonding of a metallocene to a support, but in this publication a reaction product of a metallocene and alumoxane on the support is not formed; the alumoxane serves as a conventional cocatalyst, Publication U.S. Pat. No. 5,240,894 discloses a process for the preparation of a supported metallocent/alumoxane catalyst system, wherein first a metallocene/alumoxane reaction solution is formed, a porous support is added to the solution, the solvent is removed by evaporation, and the formed catalyst precursor is possibly subjected to prepolymerization, Although this publication proposes the mixing of the support with a completed metallocene/alumoxane reaction product, the need for prepolymerization suggests deficient morphology of the catalyst. The process described in this U.S. publication is characterized in that the solvent is used in excess relative to the pore volume of the support. In this case the adsorption of the catalyst components requires an affective evaporation step, in which case the above-mentioned components, when precipitating, tend to be accumulate on the surface of the support rather than to be adsorbed evenly inside the pores. this slurry method is typical of the prior art.

The methods generally used in the prior-art patent literature for the preparation of supported metallocene-alumoxane catalysts are most commonly so-called slurry processes, in which an inert support is slurried in an inert hydrocarbon such as pentane, heptane or toluene. The catalyst components metallocene and alumoxane are then added to this slurry. In some cases the support is treated separately with a solution of the metallocene and separately with a solution of the alumoxane. Thereafter the inert hydrocarbon is evaporated by using a high temperature and/or vacuum. The product obtained is a catalyst in which the active components are attached to a sopport. Judging from the above, there have always been the problems of poor morphology of the catalyst, an uneven distribution of the substances on the support, and thus also a poor quality of the polymer particles and a low catalyst activity.

The object of the present invention is to provide a supported olefin polymerization catalyst having as good an activity as possible. The invention also aims at as good a catalyst morphology as possible, in turn giving aood morphology to the forming olefin polymer. The aim is additionally to provide a supported olefin polymerization catalyst in which the active components of the catalyst are evenly distributed over the support particles. In particular, the invention aims at producing a supported olefin polymerization catalyst which has the above-mentioned good properties and is based on a transition-metal metallocene, an activator, and a porous support. Furthermore, the process for the preparation of an olefine polymerization catalyst must be simple, efficient, and economical.

SUMMARY OF THE INVENTION

The above objects have now been accomplished with a new process for the preparation of a suported olefin polymerization catalyst. It has thus been realized that a supported olefin polymerization catalyst more active and of a better quality than previously can be obtained by a process which comorises steos of (1) providing a porous support, comprising an inorganic oxide of an element chosen from groups 2(A), 3(B) and 4 of the Periodic Table (Hubbard), (2) providing a solution comprising
   (2.1) the reaction product of
      (2.1.1) a metallocene of the formula (I)

$$(CP)_m R_n MR'_o X_p \qquad (I)$$

wherein Cp is an unsubstituted or substituted and/or fused homo- or heterocyclopentadienyl, R is a group of 1–4 atoms connecting two Cp rings, M is a transition metal of group 4A, 5A or 6A, R' is a hydrocarbyl or hydrocarboxyl group having 1–20 carbon atoms, and X is a halogen atom, and wherein m=1–3, n=0 or 1, o=0–3, p=0–3, and the sum m+n+p=the same as the state of oxidation state of M, and

(2.1.2) an alumoxane of the formula (II)

$$R''-(AlO)_x-AlR''_2 \qquad (II)$$

which formula (II) depicts a linear compound, and/or of the formula (III)

(III)

which formula (III) depicts a cyclic compound, and in which formulae (II and III) x is 1–40, y is 3–40, and R" is an alkyl group having 1–20 carbon atoms, and (2.2) a solvent, capable of dissolving the reaction product, (3) impregnating the porous support with a volume of the solution, which does not exceed the total pore volume of the porous support, and (4) recovering the impregnated porous support, the pores of which are filled with said solution.

The invention is thus based on the realization that the prior technology described above incorporates a mistake, namely the adding of the metallocene and the alumoxane to the support separately and to a slurry of the support, or the immersing of the support in a metallocene/activator reaction product. In prior-known patent literature, a solution of a metallocene/alumoxane reaction product is prepared and the support is immersed in it whereafter the solvent is evaporated. In the process now developed, the metallocene and the activator are first allowed to react with each other to form a reaction product. This reaction is seen, among other things, as a change of color of the reaction mixture. Thereafter the porous support is impregnated with an amount at maximum its pore volume with the said reaction product and solvent.

The good results of the process according to the invention may be due to a number of phenomena. One explanation may be that the adding of the active components of th catalyst either to a slurry of catalyst particles and/or separately as a solution to contact with the catalyst particls has the consequence that the components will be unable either to diffuse into the capillary pores of the catalyst particles or to react mutually in them. Another problem may be that the active catalyst compnents tend to prcipitate on the surface of the support particles when the medium has been evaporated sufficiently, in which case all the active material will not have time to travel to the interior of the support particles. This is possible, for example, when the support is immersed in a reaction product solution. A third problem is that the solubility of the metallocene in a hydrocarbon solvent is so low that, being in solid form, it will not come into contact with the pore surface of the support and thus cannot form with alumoxane a layer evenly covering the support. Regardless of the phenomenon underlying the present invention, the essential idea is that first a reaction product of the metallocene and the alumoxane, is produced, and a solid support is impregnated with the reaction product together with a solvent so that the pore spaces of the support are just barely filled.

What is involved is an impregnation which does not lead to substantial agglomeration of the support, i.e. the support will be a powder with a dry-feeling texture even after the treatment.

Another advantage of the invention is its extremely simple and rapid preparation process. Since the solvent is not used in excess, this makes unnecessary the evaporation treatment of large amounts of solvent, with recoveries and recycling, steps which especially in industrial production substantially increase both the time and cost of catalyst preparation.

According to a preferred embodiment of the invention, in the above-mentioned step (3) the solution is used in such an amount in proportion to the support that substantially all of the pore volume is filled with the reaction product and solution. This pore filling utilizes maximally the physical properties of the support pores. In pore filling, a solution of the reaction product of a metallocene and an alumoxane is added in a volume corresponding to the pore volume of the support onto the inert support. Thereby, the pores in the support are filled and the structure of the catalyst will be very homogenous throughout the catalyst plarticle.

The contacting in step (3) may occur, for example, so that the pore volume of the porous support is totally impregnated with the solvent, whereafter the support is contacted with a metallocene/alumoxane reaction product, which, when coming into contact with the solvent in the pores, diffuses into the pores. It is, however, advantageous if in step (3):

(3.1) a solution is produced which comprises the said reaction product and a solvent, and

(3.2) the porous support is impregnated with the solution.

The advantage of the process according to the present invention can be seen clearly in a comparison of catalysts prepared in different ways. The morphology of a catalyst prepared by a conventional slurry process is very poor. This can be seen in the disadvantageous shape of the obtained catalyst particles and in an uneven distribution of the active components. From this it follows that the morphology of the polymer particles is also poor (so-called replica phenomenon), the bulk density (ED) of the plastics material in the reactor is low, the particle size distribution is wide, and different particles have different plastic qualities (differences mainly in molecular weight and in molecular weight distribution).

It is advantageous for the process according to the present invention if the metallocene/alumoxane reaction product and the solution are used in such amounts that the transition-concentration in the support, calculated as zirconium, will be approx. 0.2–2.0% by weight, preferably approx. 0.6–1.6% by weight. In the process according to the invention it is also advantageous if the molar ratio of the alumoxane to the metallocene, calculated as the ratio of the aluminum of an alumoxane activator to the transition metal, is within the range 100:1–1:1, preferably 80:1–20:1 and most preferably 50:1–25:1.

In the invention, a supported olefin polymerization catalyst is prepared by using at least one metallocene compound. By metallocene is meant a metallic derivative of cyclopentadiene, and in particular a metallic derivative to which a cyclopentadienyl group is bonded with a π bond. The metallocenes used in the invention contain at least one such cyclopentadienyl ring. The metal of the metallocene is a transition metal of any of groups 4A, 5A and 6A of the Periodic Table (Hubbard), preferably of group 4A or 5A (Hubbard), such as titanium, zirconium, hafnium, chromium, or vanadium. Titanium and zirconium are especially preferable metals. The cyclopentadienyl ring may be unsubstituted or may contain substituents, such as hydrocarbyls. The cyclopentadienyl ring may also be fused, for example, with an aromatic or cycloalkyl ring. On the other hand, the ring atom of the cyclopentadienyl ring may also be a heteroatom. The metallocene used in the invention may contain one, two or three cyclopentadienyl rings, but preferably two rings.

According to the invention, the metallocene is a compound according to Formula (I)

where Cp is an unsubstituted or substituted and/or fused homo- or heterocyclopentadienyl, R is a group of 1–4 atoms connecting 2 Cp rings, M is a transition metal of group 4A, 5A or 6A (Hubbard), R' is a hydrocarbyl or hydrocarboxy group having 1–2 carbon atoms, and X is a halogen atom, in which case m=1–3, n=0 or 1, o=0–3, p=0–3, and the sum m+n+p=the same as the state of oxidation of the transition metal M.

It is preferable if the metallocene used in the process according to the invention is titanocene or zirconocene, or a mixture of these, preferably zirconocene. Typical metallocenes usable in the invention are listed, for example, on pages 10–12 of Finnish patent application No. 862525, which is incorporated herein by reference. Some examples of usable metallocenes are biscyclopentadienylzirconium dichloride $Cp_2ZrCl_2$ and bisindenylzirconium dichloride $Ind_2ZrCl_2$.

The alumoxanes used in the process form with the metallocene an active ion pair, i.e. they generate a positive charge in the transition metal. They thus ionize a neutral metallocene compound to a cationic metallocene catalyst, as stated, for example, in U.S. Pat. No. 5,242,876. Alumoxane compounds are comoosed of oligomeric linear and/or cyclic hydrocarbyl alumoxanes. According to one embodiment of the invention, the alumoxane is a linear compound according to Formula (II).

or a cyclic compound according to Formula (III)

in which formulae x is 1–40, preferably 10–20, y is 3–40, preferably 3–20, and R" is an alkyl group having 1–10 carbon atoms, or a mixture of the compounds of formulae (II) and (III).

Alumoxanes can be prepared, for example, by contacting water or a hydrogenated inorganic salt with aluminum trialkyl, whereby in general a mixture of linear and cyclic compounds is obtained. An alumoxane especially advantageous for use in the process according to the present invention is methylalumoxane, MAO, i.e. a compound according to Formula (II) and/or (III), where R" is methyl.

The support used in the process according to the invention may be any porous, subtantially inert support, such as an inorganic powder, e.g. an inorganic oxide or salt. In practice the support used is preferably a fine-grained inorganic oxide such as an inorganic oxide of an element of group 2(A), 3(B) or 4 of the Periodic Table (Hubbard), most preferably silica, alumina, or a mixture or derivative of these. Other inorganic oxides which can be used either alone or together with silica, alumina or silica-alumina, are magnesium oxide, titanium dioxide, zirconium oxide, aluminum phosphate, etc.

The support used in the process according to the invention should be dry. In gneral, metal oxide supports also contain surface hydroxyl groups which may react with metallocene or alumoxane. Before being used, an inorganic oxidic support may be dihydrated and possibly dehydroxylated. Such treatment may be either a thermal treatment or a reaction between the surface hydroxyls of the support and a reagent contacted with it.

Thermal treatment of the support is in general carried out either under vacuum or by rinsing with a dry inert gas at approx. 100–800° C., preferably 200–600° C. The support may also be subjected to a chemical treatment in which the surface hydroxyls are caused to react with substances reacting with them. Such chemical dehydroxylation reagents include $SiCl_4$, chlorosilanes such as trimethylchlorosilane, other reactive silanes such as dimethylaminotrimethyl silane or hexamethyldisilazane, alkyl amines, and alkylaluminum chlorides such as triethylaluminum, diethylaluminum chloride, etc.

The present invntion is based on the idea that the metallocene and alumoxane are first caused to react with each other, and a solution is prepared from their reaction product. A solid support is then impregnated with the solution, which is adsorbed to all pores and crevices of the support, their surfaces becoming therby activated. By a porous support is meant in this context a support which adsorbs more liquid than an entirely smooth-surfaced support. In practice the question is not necessarilly of a support in which a substantial portion of the particle volume is pore volume; it suffices that the support is in general capable of adsobing liquid. It is, however, preferable to use a support having a pore volume of approx. 0.9–3.5 ml/g. This purpose of the invention is also evident from the description presented at the beginning of the present application.

The solvent used in step (3) of the process according to the invention is any solvent which is capable of bringing a metallocene and alumoxane together and to dissolve the reaction product formed by them. Typical solvents include various oils of mineral origin and hydrocarbons such as linear and cyclic alkanes and aromatics. Especially preferred solvents include aromatics, e.g. toluene. An expert in the art is capable by experimentation to determine the optimal solvent quantity with which the transition-metal concentration in the support, calculated as zirconium, will be the above-mentioned 0.2–2.0% by weight, preferably 0.6–1.6% by weight.

In step (2) of the process according to the invention, a solution is provided which comprises the reaction product of a metallocene and an alumoxane and a solvent. Thereafter the reaction product, the solvent and a porous support are brought into contact. The solution formed by the raction product and the solvent may be prepared either by racting the metallocene and the alumoxane and by dissolving the abtained reaction product in the solvent, or by bringing together separate solutions and/or slurries of the metallocene and the alumoxane, or by adding the metallocene and the alumoxane to the same solvent, whereupon the react with each other. The components may be brought together or be added to the reaction mixture rapidly or slowly. The reacting temperature of the metallocene and the alumaxane, or the preparation temperature of the solution, may vary widely, for example within the range 0–100° C. preferable temperature is aproximately room temperature. The reaction period may vary greatly within the range approx. 30 min–20 h, but it is preferable to maintain the reaction for approximately one hour. Since the metallocene and the alumoxane are in general highly sensitive to the oxygen and moisture of air, they must be shielded for the duration of the reaction and the preparation of the solution with an atmosphere of an inert cas such as nitrogen. The obtained reaction product of the metallocene and alumoxane, or its solution, must also be stored in an oxygen-free and dry space.

The catalyst may be prepared in any reaction vessel, as long as it is provided with sufficiently good stirring, in order that the components can be distributed evenly within the support. Preferred reactor types include a so-called pivotable multi-purpose reactor, in which the position of the reactor can be changed, or a conventional batch reactor equipped with sufficient stirrer means.

In addition to the process described, the invention also relates to a supported olefin polymerization catalyst prepared by the process. Since the chemical composition and physical structure of such a catalyst are very difficult to describe, the describing is best done by defining the catalyst by its preparation process, described above. On the basis of the above specification it can, however, be stated that a supported olefin polymerization catalyst according to the invention differs from prior corresponding supported catalysts based on a metallocene and an activator in that the pores of the support are more completely and more evenly filled with the catalytically active reaction product of the metallocene and the alumoxane.

In any case it is clear that, if the components have been contacted with the support separately, or if the support has been immersed in a solution of the reaction product, the reaction between the metallocene and the alumoxane has not been the same in the different parts of the catalyst particles. it is evident that the reactions in the outer parts of a catalyst particle are different from those in its inner parts. Such layered quality of the catalyst particles can excellently be detected by the SEM-EDS method, in which metal concentrations are measured from cross-sectioned catalyst particles.

In addition to said catalyst and the process for its preparation, the invention also relates to the use of the catalyst for the homo- and copolymerization of olefins, preferably of ethylene and/or propylene. The comonomers used may be $C_2$–$C_{20}$ olefins, dienes or cyclic olefins or the like.

One of the best properties of the present catalysts is their ability to produce polyethylene having a high bulk density. According to a preferred embodiment of the invention, ethylene is slurry polymerized using a supported olefin polymerization catalyst prepared by (1) providing a porous support, which is an inorganic oxide of an element chosen from groups 2(A), 3(B) and 4 of the Periodic Table (Hubbard),

(2) providing a solution comprising
  (2.1) the reaction product of
    (2.1.1) a metallocene of the formula (I)

wherein Cp is an unsubstituted or substituted and/or fused homo- or heterocyclopentadienyl, R is a group of 1–4 atoms connecting two Cp rings, M is a transition metal of group 4A, 5A or 6A, R' is a hydrocarbyl or hydrocarboxy group having 1–20 carbon atoms, and X is a halogen atom, in which case m=1–3, n=0 or 1, o=0–3, p=0–3, and the sum m+n+p=the same as the state of oxidation of M, and
    (2.1.2) an alumoxane of the formula (II)

which formula (II) depicts a linear compound, and/or of the formula (III)

(III)

which formula (III) dipicts a cyclic compound, and in which formulae (II and III) x is 1–40, preferably 10–20, y is 3–40, preferably 3–20, and R" is an alkyl group having 1–20 carbon atoms, and (2.2) a solvent, capable of dissolving said reaction product, (3) impregnation the porous support with a volume of the solution, which does not exceed the total pore volume of the porous support, and (4) recovering the impregnated porous support, the pores of which are filled with said solution.

By such a process, a polyethylene bulk density of up to three times the density of conventional slurry polymerized polyethylene, is obtained. Compare examples 2–5 according to the invention with examples 1 and 6 according to conventional technique. In the process according to the invention, polyethylene having a bulk desity of at least 280 kg/m$^3$, preferably about 300 kg/m$^3$, is prepared.

The slurry polymerization of ethylene is preferably carried out in a hydrocarbon medium, most preferably in pentane.

A number of embodiment examples are presented below, their only purpose being to illustrate the invention.

EXAMPLE 1

Cyclopentadienylzirconium Chloride/MAO Slurry
Preparation of the Catalyst:

A solution was prepared which contained 11.07 ml of a 10 wt. % MAO solution in toluene, to which 0.138 g of Cp$_2$ZrCl$_2$ had been added. The solution was mixed until the cyclopentadiene-zirconium compound had dissolved. To the complex solution was added 3 g of GRCACE 955 W silica which had a pore volume of 1.5–1.7 ml/g and which had been calcined at 600° C. for 10 h for the removal of water and surface hydroxyls. The mixture was allowed to mix for 8 h, whereafter the toluene was evaporated off.
Polymerization of the Catalyst:

The catalyst was polymerized in a 70° C. pentane slurry. The partial pressure of ethylene was 10 bar and the hydrogen amount used was 175 ml/1 bar H$_2$. The catalyst amount used in the test polymerization was 277 mg. After one hour, the polymerization was discontinued by closing the reed of ethylene and by starting the cooling of the reactor. The yield of the reaction was 50 g of polyethylene, which gives 360 g PE/g cat h as the activity of the catalyst.
Analyses of the Polymer:

The bulk density of the polymer was 100 kg/m$^2$, MFR$_2$=16, MFR$_5$=60, MFR$_{5/2}$=3.

EXAMPLE 2

Cyclopentadienylzirconium Chloride/MAO Dry
Mixing Preparation of the Catalyst:

1 g of GRACE 955W silica calcined at 500° C. is placed in a glass flask having an inert atmosphere, for example dry and oxygen-free argon or nitrogen. 1.5 ml of a freshly prepared Cp$_n$ZrCr$_2$/MAO complex solution is added in drops onto the silica so that the Zr concentration on the support will be 1% by weight and Al/Zr=50. Thereafter, the excess toluene is evaporated by using nitrogen blowing.
Polymerization of the Catalyst:

The catalyst was polymerized at 70° C. in a pentane slurry. The partial pressure of ethylene was 10 bar and the hydrogen amount used was 1550 ml/1 bar H$_2$. The catalyst amount used in the test polymerization was 73 mg. After one hour, the polymerization was discontinued by closing the feed of ethylene and by starting the cooling of the reactor. The yield of the reaction was 22 g of polyehylene, which gives 300 g PE/g cat h as the acivity of the catalyst.
Analyses of the polymer:

The bulk density o f the polymer was 300 kg/m$^3$, Mw=5500 g mol$^{-1}$, polydispersity 3.1, MFR$_2$=>300, FRR$_{21/2}$=not measurable. As can be observed from this example, the bulk density (BD) of the polymer has increased considerably as compared with the slurry preparation process described in Example 1.

EXAMPLE 3

Bisindenylzirconium Chloride/MAO Dry Mixing
Preparation of the Catalyst:

1 g of GRACE 955W silica calcined at 500° C. is placed in a glass flask having an inert atmosphere, for example dry and oxygen-free argon or nitrogen. 1.5 ml of a freshly prepared Ind$_2$ZrCl$_2$/MAO complex solution is added in drops onto the silica so that the Zr concentration on the support will be 1% by weight and Al/Zr=50. Thereafter, the excess toluene is evaporated by using nitrogen blowing.
Polymerization of the Catalyst:

The catalyst was polymerized at 70° C. in a pentane slurry. The partial pressure of ethylene was 10 bar and the hydrogen amount used was 1550 ml/1 bar H$_2$. The catalyst amount used in the test polymerization was 85 mg. After one hour, the polymerization was discontinued by closing the feed of ethylene and by starting the cooling of the reactor. The yield of the reaction was 378 g of polyethylene, which gives 4100 g PE/g cat h as the activity of the catalyst.
Analyses of the Polymer:

The bulk density of the polymer was 280 kg/m$^3$, Mw=192,000 g mol$^{-1}$ polydispersity 8.4, MFR$_{21}$=8.0, MFR$_2$=0.3, FRR$_{21/2}$=26.7.

EXAMPLE 4

Bisindenylzirconium chloride/MAO Dry Mixing
(large batch)
Preparation of the Catalyst:

1000 g of GRACE 955 silica calcined at 500 for the removal of excess OH groups is placed in a catalyst synthesis reactor. 1500 ml of a freshly prepared Ind$_2$ZrCr$_2$/MAO complex solution is added in drops onto the silica so that the Zr concentration of the catalyst will be 1% by weight and Al/Zr=50. When all of the complex has been added onto the support, the evaporation of toluene is started immediately at room temperature, by using nitrogen blowing.
Polymerization of the Catalyst:

The catalyst was polymerized at 70° C. in a pentane slurry. The partial pressure of ethylene was 10 bar and the amount of hydrogen used was 1550 ml/1 bar H$_2$. The catalyst amount used in the test polymerization was 71 mg. After one hour, the polymerization was discontinued by closing the feed of ethylene and by starting the cooling of the reactor. The catalyst amount was 71 mg and the yield was 468 g of polyethylene, which gives 6600 g PE/g cat h as the activity of the catalyst.

Analyses of the Polymer:

The bulk density of the polymer was 300 kg/m$^3$, MFR$_2$=0.2, MFR$_{21}$=3.6.

EXAMPLE 5

Cyclopentadienylzirconium chloride/MAO Pore Filling (large batch)

Preparation of the Catalyst:

1090 g of GRACE 955 silica (P.V.=1.5–1.7 ml/g) calcined at 600° C. for the removal of excess OH groups is placed in a catalyst synthesis reactor. 1.5 l of a freshly prepared Cp$_2$ZrCl$_2$/MAO complex solution is added in drops onto the silica so that the Zr concentration of the catalyst will be 1% by weight and Al/Zr=25. When all of the complex has been added onto the support, the evaporation of toluene is started immediately at room temperature by using nitrogen blowing.

Polymerization of the Catalyst:

The catalyst was polymerized at 70° C. in a pentane slurry. The partial pressure of ethylene was 10 bar and the hydrogen amount used was 105 ml/1 bar H. The amount of catalyst used in the test polymerization was 296 mg. After one hour, the polymerization was discontinued by closing the feed of ethylene and by starting the cooling of the reactor. The yield of the reaction was 79 g of polyethylene, which gives 270 g PE/g cat h as the activity of the catalyst.

Analyses of the Polymer:

The bulk density of the polymer was 280 kg/m$^3$ MFR$_5$=89.7, MFR$_2$=33.0, MFR$_{5/2}$2.7.

EXAMPLE 6

Cyclopentadienylzirconium Chloride/MAO Slurry (large batch)

Preparation of the Catalyst:

1000 g of GRACE 955 W silica (P.V.=1.5–1.7 ml/g) calcined at 600° C. was placed in a catalyst synthesis reactor. 3750 ml of a 10 wt. % MAO solution in toluene was added onto the silica. The mixture was stirred overnight, whereafter the toluene was evaporated. When the product was dry, onto it was added 1450 ml of a toluene solution to which 13 g of Cp$_2$ZrCl$_2$ had been added. Thereafter the excess toluene was evaporated, whereafter the catalyst was ready.

Polymerization of the Catalyst:

The catalyst was polymerized at 70° C. in a pentane slurry. The partial pressure of ethylene was 10 bar, and the hydrogen amount used was 175 ml/1 bar H$_2$. The catalyst amount used in the test polymerization was 222 mg. After 1 h 52 m mn the polymerization was discontinued by closing the feed of ethylene and by starting the cooling of the reactor. The yield of the reaction was 110 g of polyethylene, which gives 247 g PE/g cat h as the activity of the catalyst.

Analyses of the Polymer:

The bulk density of the polymer was 100 kg/m$^3$. A comparison of the bulk density of tnis example to the bulk density of the previous example shows again that the morphology of a polymer prepared by a slurry process is poor.

EXAMPLE 7

Fluidized Bed Gas Phase Pilot Plant Test, Dry Mixed Catalyst

Catalyst Preparation: See Example 5.

Polymerization of the Catalyst:

Catalyst prepared according to patent example 5 was tested in fluidized bed gas phase reactor. Reactor temperature was 80° C., ethylene artial pressure was 13 bar and production rate was 10 kgPE/h.

Figure 1:
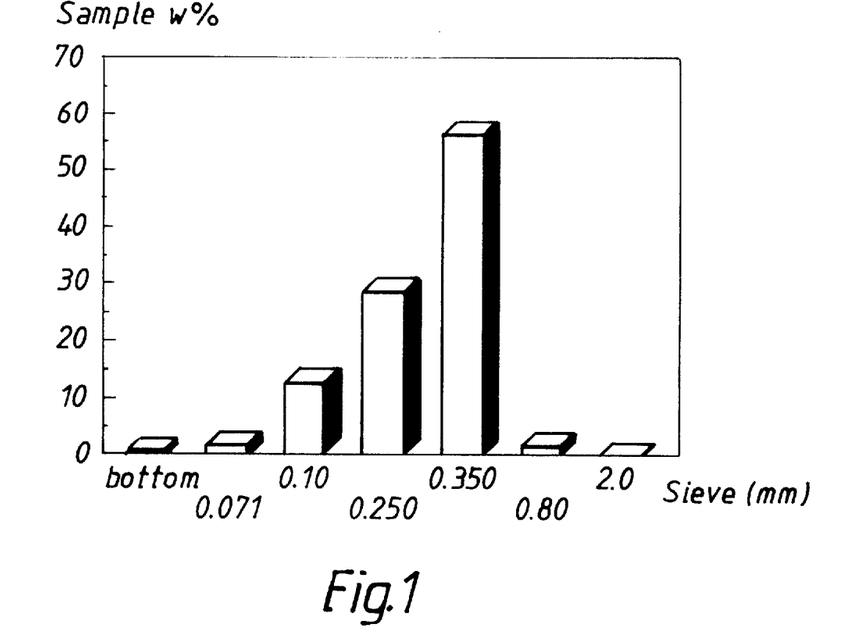
FIG. 1 is a bar graph analysis of the polymer particle size distribution of Example 7.
Figure 2:
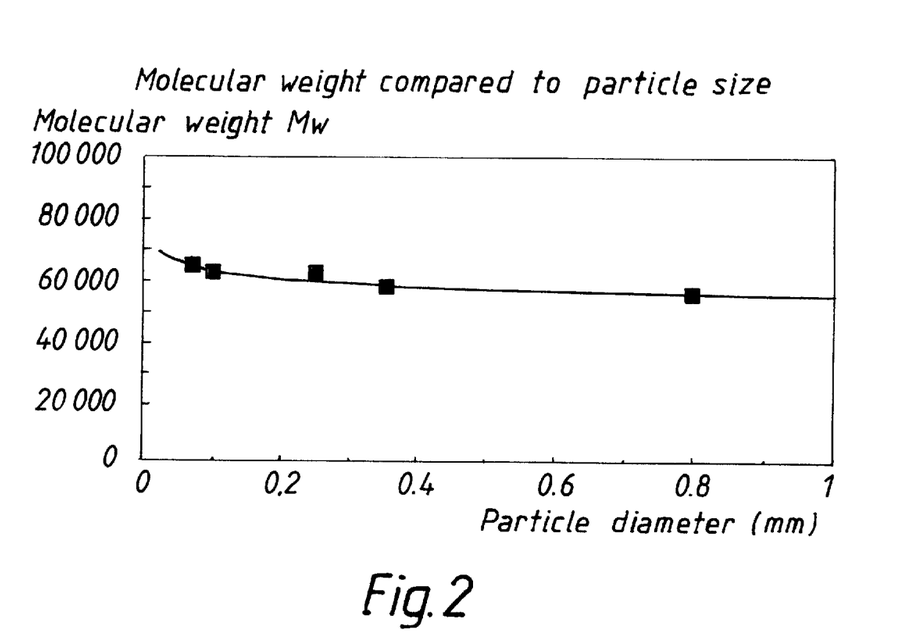
FIG. 2 is a graph of the molecular weight of the polymer vs. particle diameter of Example 7.
Figure 3:
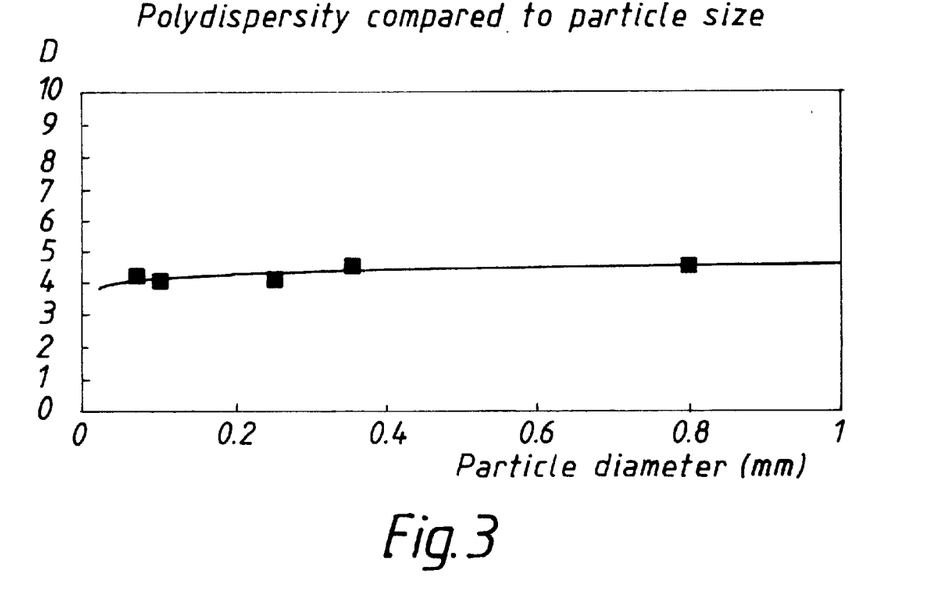
FIG. 3 is a graph of the polydispersity vs. particle diameter of Example 7.

Analyses of the Polymer:

MFR$_{21}$=15.8, MFR$_2$=0.52, FPR$_{21/2}$=29.2, Density=0.9545, Ash content 940 ppm, Bulk density 530 kg/m$^3$. Polymer particle distribution: see FIG. 1. Polymer Mw versus particle size: see FIG. 2. Polydispersity versus particle size: see FIG. 3.

EXAMPLE 8

Fluidized Bed Gas Phase Pilot Plant Test, Slurry Prepared Catalyst

Catalyst Preparation: See Example 6.

Polymerization of the Catalyst:

Catalyst prepared according to patent example 6 was tested in fluidized bed gas phase reactor. Reactor temperature was 80° C., ethylene partial pressure was 11 bar and production rate was 3–7 kgPE/h.

Figure 4:
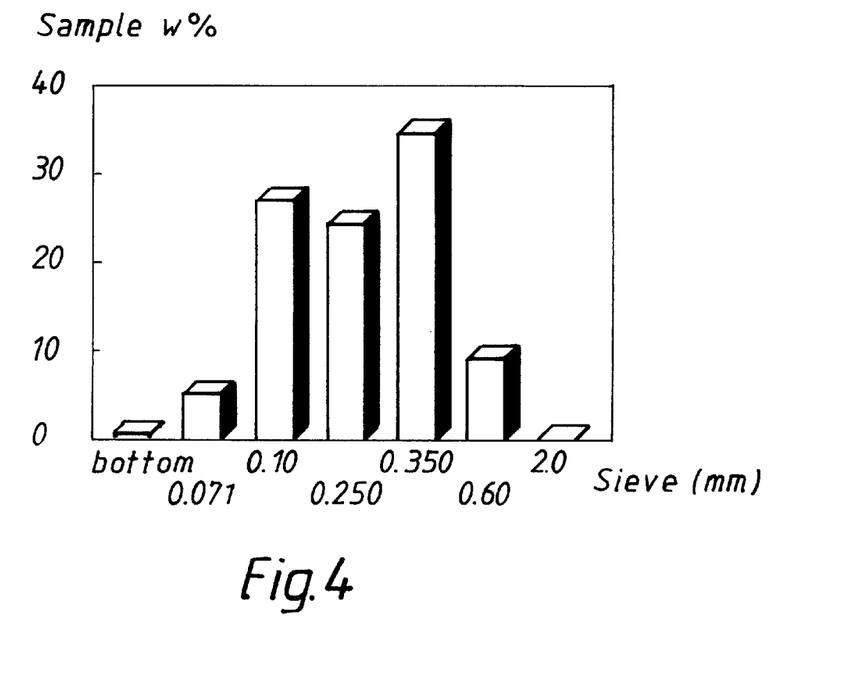
FIG. 4 is a bar graph analysis of the polymer particle size distribution of Example 8.
Figure 5:
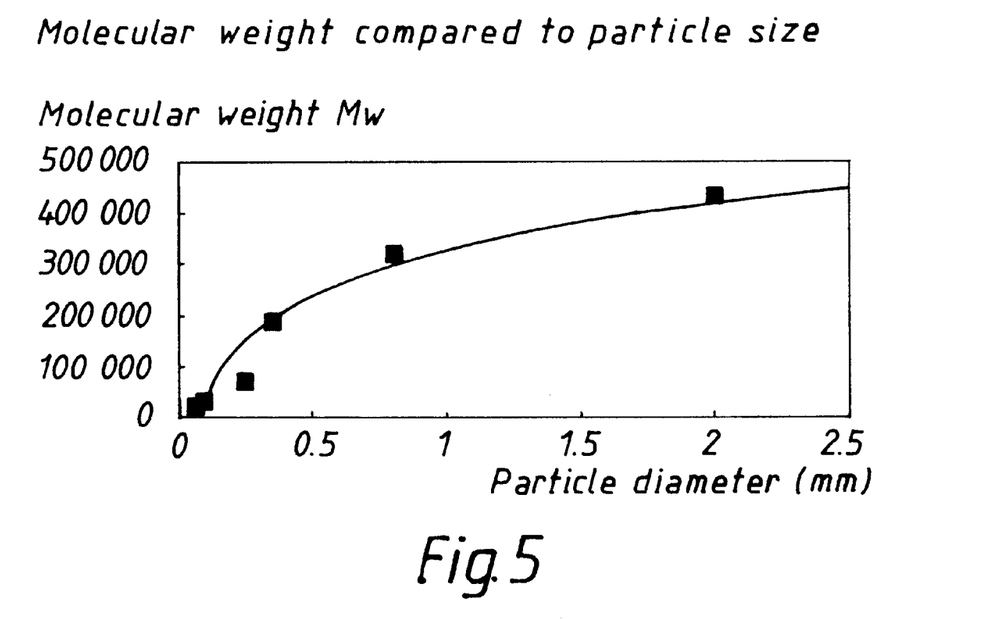
FIG. 5 is a graph of the molecular weight of the polymer vs. particle diameter of Example 8.
Figure 6:
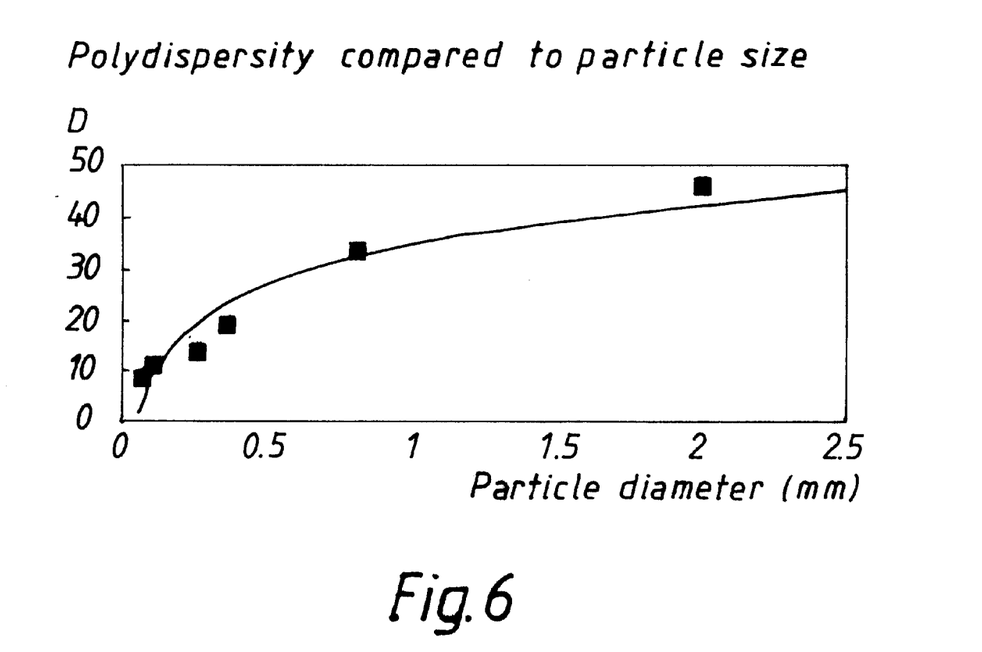
FIG. 6 is a graph of the polydispersity vs. particle diameter of Example 8.

Analyses of the Polymer:

MFR$_{21}$=300–900, MFR$_2$=2–7, FRR$_{21/2}$=150, Density=0.963, Ash content 185 ppm, Bulk density 530 kg/m$^3$. Polymer particle distribution: see FIG. 4. Polymer Mw versus particle size: see FIG. 5. Polydispersity versus particle size: see FIG. 6.

COMPARATIVE EXAMPLE 9

Slurry Preparation

Preparation of the Catalyst:

Onto 1 g of GRACE 955 W silica (P.V.=1.5–1.7 mL/g), calcinated at 800° C. 10 h for the removal of excess of —OH groups, is mixed 3.4 mL of 10% by weight MAO/toluene solution. This mixture is stirred at 650° C. for 1 hour. Then a mixture of metallocene (bis(n-butylcyclopentadienyl)ZrCl$_2$) and toluene is added to the reactor and allowed to react 30 minutes at 65° C. The catalyst is then dried under nitrogen.

Analyses of the Catalyst:

SEM (Scanning Electron Microscope) pictures of catalyst particles are showing inhomogeneous particle structure with lot of catalyst fines. Also single catalyst particles seem to have some kind of crystals onto particle surface. These crystals are evidently crystallised MAO/metallocene structures.

Polymerization of the Catalyst:

Catalyst was polymerized in a 3L autoclave at 700° C. pentane slurry. The partial pressure of ethylene was 10 bar and the hydrogen amount was 1550 mL/1 bar H$_2$. The catalyst amount used in test polymerization was 76 mg. After 60 min polymerization the polymerization was stopped by closing the feed of ethylene and by starting the cooling of the reactor. The yield of the reaction was 323 g of polyethylene which gives 4250 g PE/g cat h as the activity of the catalyst.

Analyses of the Polymer

Figure 7:
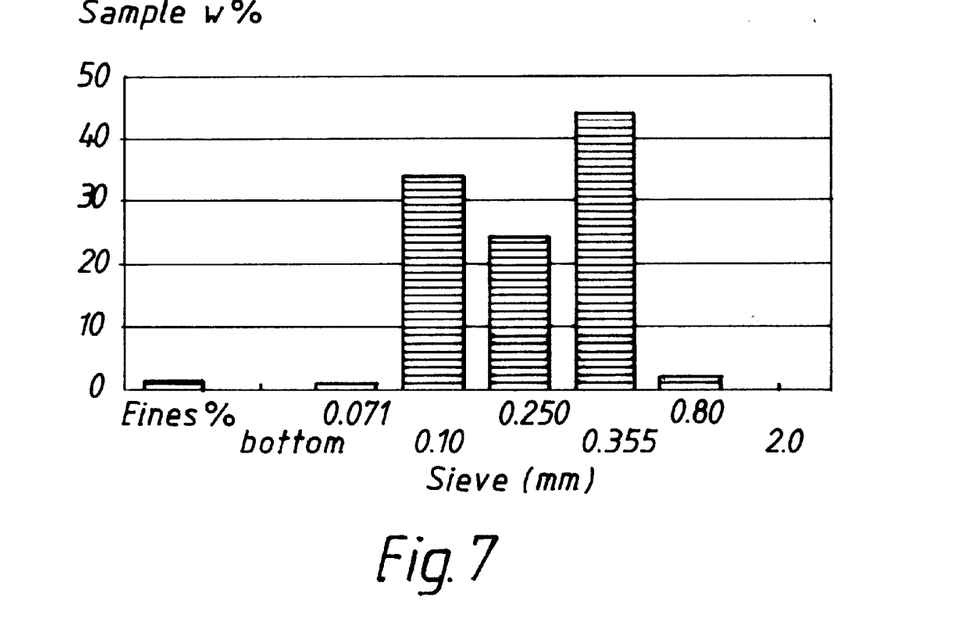
FIG. 7 is a bar graph of the polymer particle size distribution of Example 9.

The bulk density of the polymer was 147 kg/m$^3$, MFR$_2$=2.73, MFR$_{21}$=76.5. Sieving of the polymer: see FIG. 7.

SEM pictures were also taken from polymer formed with catalyst used. The inhomogeneity of polymer is seen very clearly. Polymer particle structure is very porous and particle morphology is very bad.

EXAMPLE 10

Pore filling Method

Preparation of the Catalyst:

1143 g or GRACE 955 W silica (P.V.=1.5–1.7 mL/g), calcinated at 500° C. for the removal of excess of —OH groups, is placed in a catalyst synthesis reactor. 1700 mL of a freshly prepared n-butylcyclopentadienyl-ZrCl$_2$/MAO/toluene complex solution is added in drops onto the silica, so that the Zr content of the catalyst will be 0.25% by weight and Al/Zr=200. When all of the complex has been added onto the support, the evaporation of toluene is started immediately at room temperature.

Analyses of the Catalyst:

SEM (Scanning Electron Microscope) pictures of catalyst particles are showing very homogenous catalyst structure without any fines or crystalline structures onto catalyst surface.

Polymerization of the Catalyst:

Catalyst was polymerized in a 3L autoclave at 80° C. pentane slurry. The partial pressure of ethylene was 10 bar and the hydrogen amount was 1550 mL/1 bar H$_2$. The catalyst amount used in test polymerization was 74 mg. After 60 min polymerization the polymerization was stopped by closing the feed of ethylene and by starting the cooling of the reactor. The yield of the reaction was 205 g of polyethylene which gives 2800 g PE/g cat h as the aczivity oL the catalyst.

Analyses of the Polymer

Figure 8:
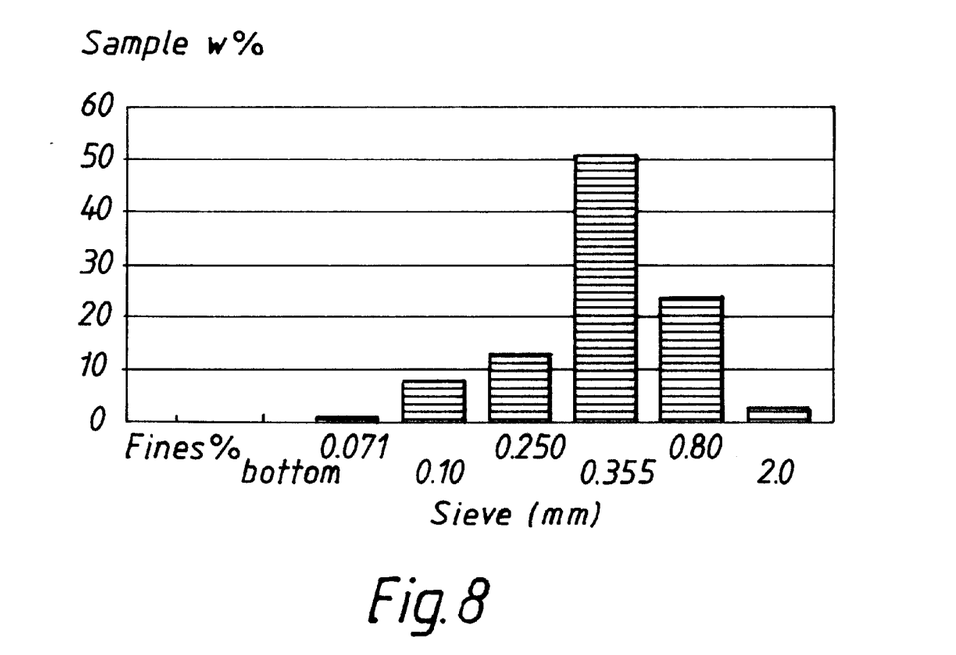
FIG. 8 is a bar graph of the polymer particle size distribution of Example 9.

MFR$_2$=2.8, MFR$_{21}$=76.5. Sieving of the polymer: see FIG. 8.

Polymerization of the Catalyst:

Catalyst was polymerized in a 3L autoclave at 70° C. pentane slurry. The partial pressure of ethylene was 10 bar and the hydrogen amount was 1550 mL/1 bar H$_2$. The catalyst amount used in test polymerization was 70 mg. After 60 min polymerization the polymerization was stopped by closing the feed of ethylene and by starting the cooling of the reactor. The yield of the reaction was 302 g of polyethylene which gives 4300 g PE/g cat h as the activity of the catalyst.

Analyses of the Polymer

Figure 9:
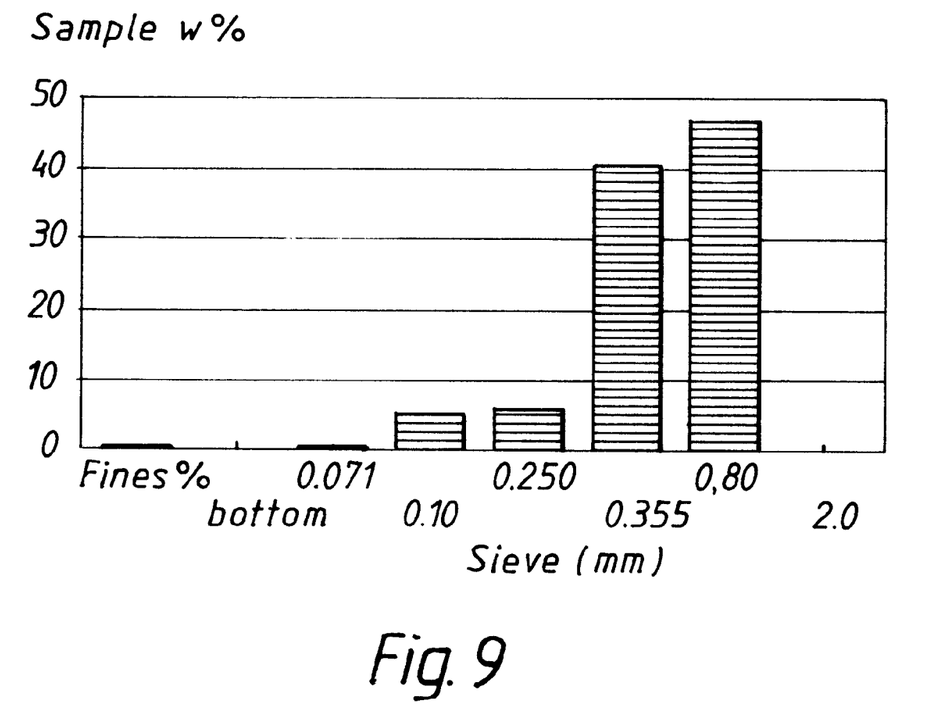
FIG. 9 is a bar graph of the polymer particle size distribution of Example 9.

Bulk Density=250 kg/m$^3$, MFR$_2$=0.23, MFR$_{21}$=4.9. Sieving of the polymer: see FIG. 9.

SEM pictures were also taken from polymer formed with catalyst used. The homogeneity of polymer is seen very easily. Polymer particle morphology is excellent and catalyst particle replica phenomena has worked well.

TABLE 1

Polymerization catalyst and product characteristics in examples.

| Ex | g support | Pore volume/ ml/g | Total pore volume e | Used liquid volume e | Polymerization medium | Activity kgPE/g cat h | MFR$_2$ | MFR$_{21}$ | BD/mg/m$^3$ | Ligand L[1] |
|---|---|---|---|---|---|---|---|---|---|---|
| 1 | 3 | 1.5–1.7 | 4.5–5.1 | 11.07 | Pentane Slurry | 0.36 | 16 | Very high | 100 | Cp |
| 2 | 1 | 1.5–1.7 | 1.5–1.7 | 1.5 | Pentane Slurry | 0.30 | 300 | Very high | 300 | Cp |
| 3 | 1 | 1.5–1.7 | 1.5–1.7 | 1.5 | Pentane Slurry | 4.10 | 0.3 | 8.0 | 280 | Ind |
| 4 | 1000 | 1.5–1.7 | 1500–1700 | 1500 | Pentane Slurry | 6.6 | 0.2 | 3.6 | 300 | Ind |
| 5 | 1090 | 1.5–1.7 | 1500–1700 | 1500 | Pentane Slurry | 0.27 | 33 | Very high | 280 | Cp |
| 7 | 1090 | 1.5–1.7 | 1500–1700 | 1500 | Gas Phase Pilot | −1.0 | 0.52 | 15.8 | 530 | Cp |
| 6 | 1000 | 1.5–1.7 | 1500–1700 | 3750 | Pentane Slurry | 0.25 |  |  | 100 | Cp |
| 8 | 1000 | 1.5–1.7 | 1500–1700 | 3750 | Gas Phase Pilot | −0.5 | 2–7 | 300–900 | 530 (but material inhomogeneous | Cp |
| 9 | 1 | 1.5–1.7 | 1.5–1.7 | 3.4 | Pentane Slurry | 4.3 | 2.73 | 76.5 | 147 | n-BuC$_p$ |
| 10 | 1143 | 1.5–1.7 | 1715–1943 | 1700 | Pentane Slurry | 2.8 | 2.8 | 76.5 | 250 | n-BuC$_p$ |
| 11 | 940 | 1.5–1.7 | 1190–1598 | 1400 | Pentane Slurry | 4.3 | 0.23 | 4.9 | 250 | Ind |

[1]C$_p$ = cyclopentadienyl
Ind = indenyl
n-Bu$c_p$ = n-butyl cyclopentadienyl

SEM pictures were also taken from polymer formed with catalyst used. The homogeneity of polymer is seen very easily. Polymer paricle morphology is excellent and catalyst particle replica phenomena has worked well.

EXAMPLE 1

Pore Filling Method

Preparation of the Catalyst:

940 g of GRACE 955 W silica (P.V.=1.5–1.7 mL/g), calcsinated at 600° C. for the removal of excess of —OH groups, is placed in a catalyst synthesis reactor. 1400 mL of a freshly prepared bisindenyl-ZrCl$_2$/MAO/toluene complex solution is added in drops onto the silica, so that the Zr content of the catalyst will be 1% by weight and Al/Zr=50. When all of the complex has been added onto the support, the evaporation of toluene is started immediately at room temperature.

Analyses of the Catalyst:

SEM (Scanning Electron Microscope) pictures of catalyst particles are showing very homogeneous catalyst structure without any fines or crystalline structures onto catalyst surface.

What is claimed is:

1. A process for the preparation of ethylene copolymers consisting essentially of:

(1) providing a porous support, which is an inorganic oxide of an element selected from the group consisting of Groups 2(A), 3(B), and 4 of the Periodic Table (Hubbard);

(2) providing a solution consisting essentially of
(2.1) a reaction product of
(2.1.1) a metallocene of the formula (I)

$$(Cp)_m R_n MR'_o X_p \qquad (I)$$

wherein Cp is an unsubstituted or substituted and/or fused cyclopentadienyl group, R is a group of 1–4 atoms connecting two Cp rings, M is a transition metal selected from the group consisting of Groups 4A, 5A and 6A, R' is a hydrocarbyl or hydrocarboxy group having 1–20 carbon atoms, and X is a halogen atom, wherein m=2–3, n=0 or 1, o=0–3, p=0–3, and the sum m+o+p=the same as the state of oxidation of M, with (2.1.2) an alumoxane of the formula (II)

(II)

which formula (II) depicts a linear compound, and/or of the formula (III)

(III)

which formula (III) depicts a cyclic compound, and in which formulae (II and III) x is 1–40, y is 3–40, and R" is an alkyl group having 1–20 carbon atoms, and (2.2) a solvent, capable of dissolving said reaction product;

(3) impregnating said porous support with a volume of the solution, which does not exceed the total pore volume of the porous support; and (4) recovering the impregnation product as a supported ethylene co-polymerization catalyst; and (5) conducting a slurry co-polymerization of ethylene in a hydrocarbon medium and in the presence of essentially only said supported ethylene co-polymerization catalyst.

2. The process according to claim 1, comprising impregnating said porous support with an amount of said solution equal to its pore volume.

3. The process according to claim 1, wherein the molar ratio of the alumoxane to the metallocene, calculated as the ratio of aluminum to the transition metal, is within the range 50:1–25:1.

4. The process according to claim 1, wherein the metallocene is selected from the group consisting of a titanocene and a zirconocene, or a mixture thereof.

5. The process according to claim 1, wherein the alumoxane is methylalumoxane.

6. The process according to claim 1, wherein the porous support is selected from the group consisting of a silica and an alumina, or a mixture or derivative thereof.

7. The process according to claim 6, wherein the porous support has been treated thermally and/or chemically for the removal of water and any surface hydroxyls.

8. The process according to claim 1, wherein the solvent is a hydrocarbon.

9. The process according to claim 1, wherein x in formula II is 10–20.

10. A process for the preparation of ethylene copolymers consisting essentially of:

(1) providing a porous support, which is an inorganic oxide of an element selected from the group consisting of Groups 2(A), 3(B), and 4 of the Periodic Table (Hubbard);

(2) providing a solution consisting of
  (2.1) a reaction product of
    (2.1.1) a metallocene of the formula (I)

(I)

wherein Cp is an unsubstituted or substituted and/or fused cyclopentadienyl group, R is a group of 1–4 atoms connecting two Cp rings, M is a transition metal selected from the group consisting of Groups 4A, 5A and 6A, R' is a hydrocarbyl or hydrocarboxy group having 1–20 carbon atoms, and X is a halogen atom, wherein m=2–3, n=0 or 1, o=0–3, p=0–3, and the sum m+o+p=the same as the state of oxidation of M, with (2.1.2) an alumoxane of the formula (II)

(II)

which formula (II) depicts a linear compound, and/or of the formula (III)

(III)

which formula (III) depicts a cyclic compound, and in which formulae (II and III) x is 1–40, y is 3–40, and R" is an alkyl group having 1–20 carbon atoms, and (2.2) a solvent, capable of dissolving said reaction product;

(3) impregnating said porous support with a volume of the solution, which does not exceed the total pore volume of the porous support; and (4) recovering the impregnation product as a supported ethylene co-polymerization catalyst; and (5) conducting a slurry co-polymerization of ethylene in a hydrocarbon medium and in the presence of essentially only said supported ethylene co-polymerization catalyst.

* * * * *